(12) United States Patent
Gareis

(10) Patent No.: US 9,371,935 B2
(45) Date of Patent: Jun. 21, 2016

(54) ADAPTER FOR AN ASSEMBLY HAVING A VALVE AND A POSITIONER

(71) Applicant: Siemens Aktiengesellschaft, Munich (DE)

(72) Inventor: Jochen Gareis, Hagenbach (DE)

(73) Assignee: Siemens Aktiengesellschaft, Munich (DE)

( * ) Notice: Subject to any disclaimer, the term of this patent is extended or adjusted under 35 U.S.C. 154(b) by 122 days.

(21) Appl. No.: 14/349,610

(22) PCT Filed: Oct. 4, 2012

(86) PCT No.: PCT/EP2012/069604
§ 371 (c)(1),
(2) Date: Apr. 3, 2014

(87) PCT Pub. No.: WO2013/050459
PCT Pub. Date: Apr. 11, 2013

(65) Prior Publication Data
US 2014/0246613 A1 Sep. 4, 2014

(30) Foreign Application Priority Data
Oct. 6, 2011 (DE) .......................... 10 2011 084 096

(51) Int. Cl.
F16K 31/124 (2006.01)
F15B 15/14 (2006.01)
F16K 27/02 (2006.01)
F15B 15/20 (2006.01)

(52) U.S. Cl.
CPC .............. *F16K 31/124* (2013.01); *F15B 15/149* (2013.01); *F15B 15/202* (2013.01)

(58) Field of Classification Search
CPC .............. F16K 27/0281; F16K 31/124; Y10T 137/87885; Y10T 137/5196; F15B 15/202; F15B 15/149
USPC .............. 251/291; 137/270, 884, 315.11, 271, 137/15.17, 15.09
See application file for complete search history.

(56) References Cited

U.S. PATENT DOCUMENTS

| | | | |
|---|---|---|---|
| 4,727,899 A | 3/1988 | Massey et al. | |
| 4,964,273 A | 10/1990 | Nash | |
| 6,186,471 B1 | 2/2001 | Genga et al. | |
| 6,250,323 B1 | 6/2001 | Genga et al. | |
| 6,290,207 B1 | 9/2001 | Genga et al. | |
| 6,354,327 B1 | 3/2002 | Mayhew | |
| 6,371,440 B1 | 4/2002 | Genga et al. | |

FOREIGN PATENT DOCUMENTS

| | | |
|---|---|---|
| CN | 1306607 | 8/2001 |
| DE | 10350305 | 5/2005 |
| EP | 1632679 | 3/2006 |
| GB | 2245313 | 1/1992 |

*Primary Examiner* — Marina Tietjen
(74) *Attorney, Agent, or Firm* — Cozen O'Connor

(57) ABSTRACT

An adapter for an assembly having a valve and a positioner, which are configured for pipeless valve mounting according to the guideline VDI/VDE 3847, wherein the adapter is intended to be installed between the valve and the positioner, and the adapter enables a variably adjustable position of the valve relative to the positioner, such that possible collisions between the valve and other parts located near the interface intended for the installation of the valve can be largely avoided.

3 Claims, 3 Drawing Sheets

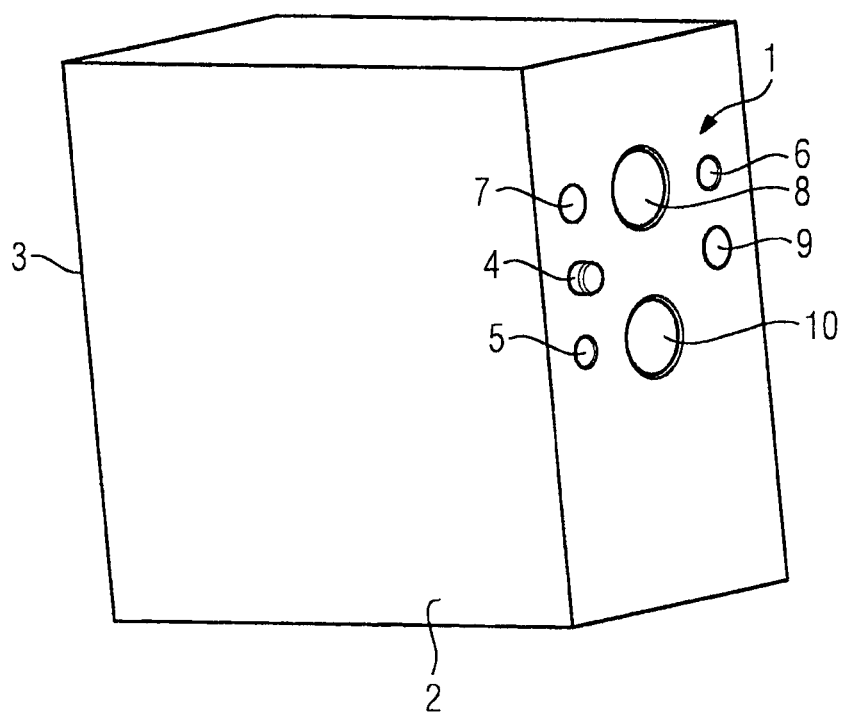
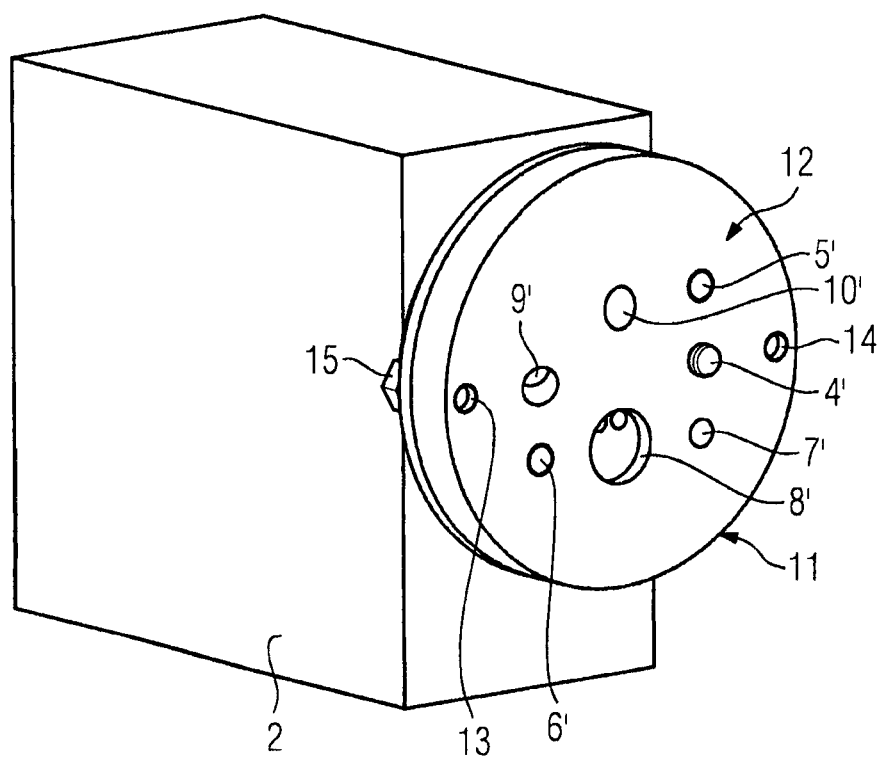

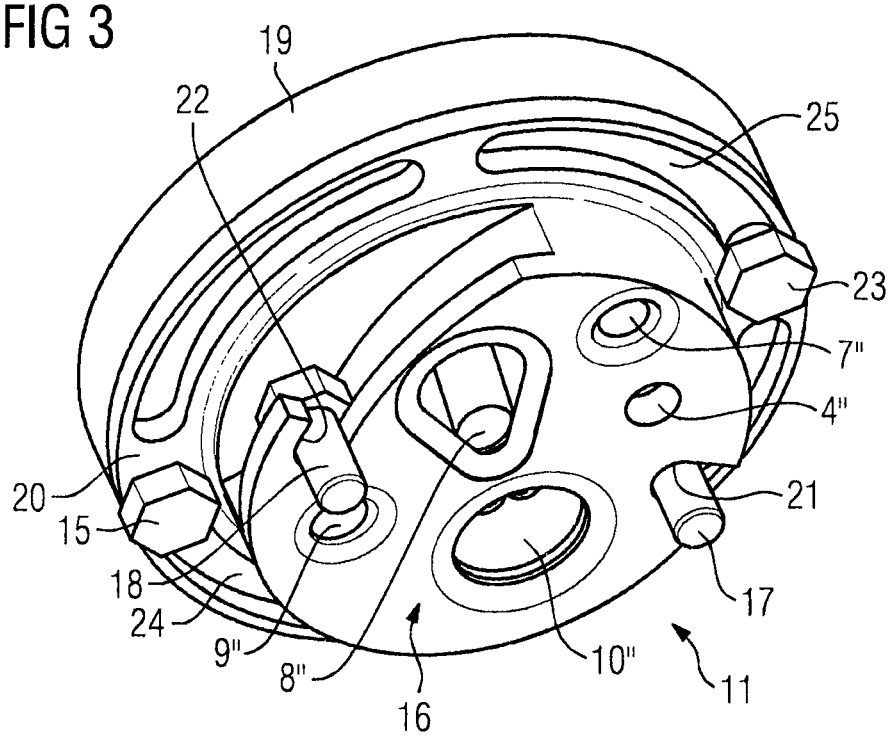

ADAPTER FOR AN ASSEMBLY HAVING A VALVE AND A POSITIONER

REFERENCE TO RELATED APPLICATIONS

This is a U.S. national stage of application No. PCT/EP2012/069604 filed 4 Oct. 2012. Priority is claimed on German Application No. 102011084096.6 filed 6 Oct. 2011, the content of which is incorporated herein by reference in its entirety.

BACKGROUND OF THE INVENTION

1. Field of the Invention

The invention relates to an adapter for an assembly having a valve and a positioner, where the valve includes a first interface and the positioner includes a second interface corresponding thereto, which are each configured for tube-less and pipe-less connection of the valve to the positioner in accordance with the guideline VDI/VDE 3847.

2. Description of the Related Art

In order to control process valves, use is frequently made of pneumatic actuating drives (i.e., positioners), in which a diaphragm acting on an actuating element, such as on a closing element of a control valve, has pressure applied to it with the aid of a gaseous medium, for which in this application the general term "air" will be used, and is thus deflected. The application of a variable pressure to the diaphragm can be performed on one side, where the diaphragm is loaded by a spring on the other side, or it can be performed on both sides, with different pressures on the two sides of the diaphragm generating a drive force. The control of the pressures is performed via an electro-pneumatic position controller, in which an electrically actuated valve distributes feed air under pressure to the two sides of the diaphragm in the actuating drive via two air exhaust connections, depending on the activation.

EP 1 632 679 A1 discloses an electro-pneumatic position controller, in which a valve for distributing compressed air to two air exhaust connections can be employed in two different installation positions, where control air connections of the valve are each connected in an aligned manner to another of the two air exhaust connections in the two installation positions.

U.S. Pat. No. 6,354,327 B1 describes an assembly having an electro-pneumatic position controller and a pneumatic drive, in which a pneumatic switch is inserted between position controller and drive in order to permit a manual intervention.

The guideline VDI/VDE 3847 describes an additional interface between the drive of a positioner and position controller. Particular attention was directed to the mounting of the position controller being suitable for high vibration and shock loading and for pipe-less solenoid valve mounting in accordance with VDI/VDE 3845. The basis of the concept is the mounting of the position controller from the front on a vertical surface of the bonnet, which is provided with air ducts and fixing threads and a coding pin. Via the air ducts, both the feeding of the feed air and the connection to single-acting or double-acting drives are performed. As a result, replacement of the position controller is possible without disassembling existing feed air or control air lines. On the same side of the bonnet, at the back, a second vertical surface is provided, is likewise provided with air ducts and fixing threads and can also be used as a second interface for tube-less and pipe-less mounting of a solenoid valve. The connecting surfaces for the solenoid valve and position controller are optionally a fixed constituent part of the bonnet or can be implemented via a separate connecting block fixed to the bonnet. Since, in the aforementioned guideline, only the minimal size of the connecting surface, the position of the threaded holes, of a dowel pin and the inlet and outlet openings of air ducts are defined, but not a clearance which has to be provided in the area of the second interface for the mounting of the solenoid valve, there is the problem that, in the case of some drives, it is possible for a collision to occur between the solenoid valve and, for example, the head of the drive, if an attempt is made to mount the solenoid valve on the second interface when there is inadequate clearance.

SUMMARY OF THE INVENTION

It is therefore an object of the invention to provide an adapter by which the mounting of a valve, i.e., a solenoid valve, on the interface of a positioner, provided for the purpose in accordance with guideline VDI/VDE 3847, is made easier.

In order to achieve this object, the novel adapter of the type mentioned at the beginning has the features specified in the characterizing part of claim 1. Advantageous developments are described in the dependent claims.

This and other objects and advantages are achieved in accordance with the invention by providing an adapter which is advantageously installed between a valve and positioner to provide the possibility to variably adjust the position of the valve relative to the positioner. The adapter can be mounted on an existing interface that is implemented in accordance with guideline VDI/VDE 3847, and can therefore be used universally. Specific adapters, which have to be constructed as a special solution for a specific application, are normally no longer required.

A particularly simple and robust embodiment of the adapter can be obtained if, via the adapter, the rotation of the valve with respect to the positioner is variably adjustable. An adapter of this type can be implemented with comparatively little effort in an embodiment that is suitable for high vibration and shock loading. For the implementation thereof, substantially as few as two adapter parts, which are rotatable relative to each other to adjust the rotation, are advantageously sufficient. For each air duct to be led via the adapter, an annular duct arranged substantially concentrically with respect to the axis of rotation can be provided between the two adapter parts, which is delimited by the latter. In each case, a feed duct in the two adapter parts produces the connection of the annular duct to the two pneumatic interfaces of the adapter. As a result of the virtually continuous possibility of rotation through virtually 360°, achieved in this way, in most cases the above-described collision problem can be avoided. Special solutions for fixing a solenoid valve can thus normally be dispensed with.

If the two interfaces of the adapter are arranged parallel to each other, these can advantageously firstly be screwed to a corresponding interface of the positioner and, secondly, on the opposite side, again provide an interface of exactly the same type, so that a solenoid valve can be mounted on the interface. Thus, a "sandwich" configuration of the assembly, in which the adapter is located between the positioner and the solenoid valve, which each have interfaces according to the guideline VDI/VDE 3847, is advantageously obtained.

By means of a specific configuration of slots to receive fixing screws, with a comparatively low overall height of the adapter, good accessibility of the fixing screws for a tool can advantageously be obtained.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

By using the drawings, in which an exemplary embodiment of the invention is shown, the invention and refinements and advantages will be explained in more detail below, wherein:

FIG. 1 shows a perspective view of a connecting block;

FIG. 2 shows a connecting block with attached adapter in accordance with the invention;

FIG. 3 shows a perspective view of the rear side of the adapter in accordance with the invention;

DETAILED DESCRIPTION OF THE PREFERRED EMBODIMENTS

Figure 4:
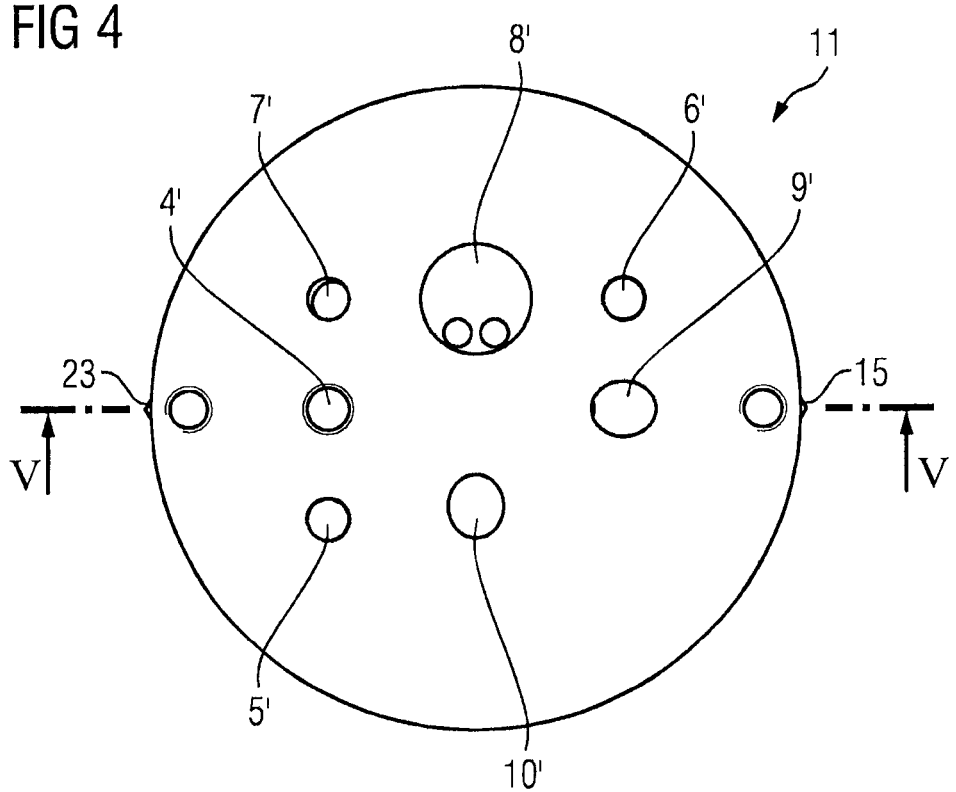
FIG. 4 shows a plan view of the front side of the adapter in accordance with the invention.

In the drawings, the same parts are provided with the same designations.

As known, a solenoid valve having a first interface, (not shown) can be mounted on a second interface 1 of a positioner. In the exemplary embodiment shown in FIG. 1, this second interface 1 is arranged on the rear side of a separate connecting block 2, on the front side 3 of which, facing away, there is a further interface for a position controller (not shown). The design of the second interface 1 is familiar to those skilled in the art in the area of process instrumentation which deals with control valves and position controllers, and does not have to be explained in more detail here. In FIG. 1, a dowel pin 4, two threaded holes 5 and 6 and four air ducts 7, 8, 9 and 10 of the interface 1 are visible.

A solenoid valve mounted on the second interface 1 can be used, for example, to vent a drive, so that a positioner provided therewith moves to a safety position irrespective of the respective operating state of a position controller. If no such solenoid valve is needed, a closure cover, in which the supply of the position controller with feed air is ensured, at least via suitable internal duct guidance, can be placed on the second interface 1.

In order that a solenoid valve can be mounted in any rotational orientation on the connecting block 2, and thus possible collisions with further parts of the positioner can be avoided, according to FIG. 2 an adapter 11 is attached to the second interface 1 of the connecting block 2. On its remote side, the adapter 11 has a third interface, which corresponds to the second interface 1 (FIG. 1). On the visible side thereof, the adapter 11 offers a fourth interface 12, the connecting elements 4' . . . 10' of which correspond to the connecting elements 4 . . . 10 of the second interface 1. In the illustration according to FIG. 2, the fourth interface 12 has been rotated through 180° with respect to the second interface 1 shown in FIG. 1. Fixing screws, of which only one fixing screw 15 is visible in FIG. 2, are screwed into threaded holes 13 and 14 in order to fix the rotational position.

FIG. 3 shows a perspective view of the adapter 11, in which the third interface 16 thereof, which is used to mount the adapter 11 on the second interface 1 (FIG. 1) of the connecting block 2, is easily visible. During the mounting, firstly two fixing screws 17 and 18 are screwed partly into the threaded holes 5 and 6 (FIG. 1) of the second interface 1. The adapter 11 comprises a first adapter part 19 and a second adapter part 20 that can be rotated relative thereto. The second adapter part 20 is provided with a first slot 21 and a second slot 22, which are used to receive the fixing screws 17 and 18. During the mounting, the second adapter part 20 is firstly pushed onto the partly screwed-in fixing screw 17 in a translational movement such that the shank thereof comes to lie in the first slot 21. The second adapter part 20 is then rotated about the axis of the fixing screw 17 until the shank of the fixing screw 18 is located in the slot 22. This is made possible via specific cam milling of the slot 22. The two fixing screws 17 and 18 are then tightened with an open-end wrench. By means of the described specific configuration of the second adapter part 20, trouble-free mounting of the adapter 11 on the positioner is thus made possible, although the fixing screws 17 and 18 are not accessible from above.

The third interface 16 is configured in a way corresponding to the second interface 1 (FIG. 1) and, accordingly, has a hole 4" for the dowel pin 4 and ducts 7", 8", 9" and 10" which, during the connection of the third interface 16 to the second interface 1, are connected to ducts 7, 8, 9 and 10. Two fixing screws 15 and 23 are used to fix the rotational position at the two adapter parts 19 and 20 and, for the variable adjustment of the rotational position, are introduced into guide slots 24 and 25 in the shape of circular arcs.

Figure 5:
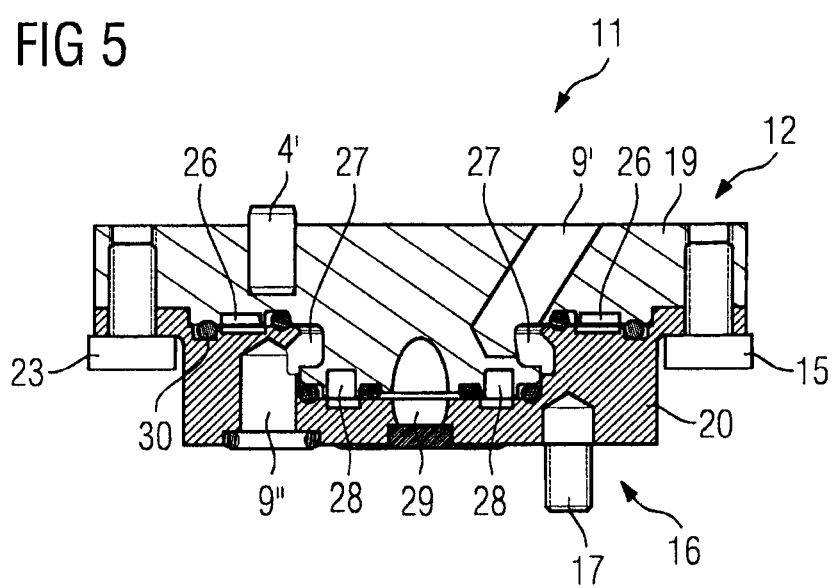
FIG. 5 shows a sectional view of an adapter in accordance with the invention.

In order to illustrate the internal structure of the adapter 11, in FIG. 5 a sectional view for a section along a line V-V shown in FIG. 4 is illustrated. The ducts are led via the adapter 11 with the aid of concentrically arranged annular ducts 26, 27, 28 and 29, which are delimited by the two adapter parts 19 and 20 and are sealed off by O-ring seals, such as a seal 30. In FIG. 5, by way of example, the course of duct 9' of the fourth interface 12, which can also be designated a feed duct, via the annular duct 27 and the duct 9" which, in this connection, can likewise be designated a feed duct, to the third interface 16 is shown. By means of further holes, not visible in FIG. 5, the further three passages of the air ducts are also produced in an analogous way via the annular ducts 26, 28 and 29. As a result of the use of the annular ducts 26 . . . 29, the ability to rotate the two adapter parts 19 and 20 with a simultaneously stable structure for a high vibration and shock load-bearing ability is achieved.

Thus, while there have been shown, described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements which perform substantially the same function in substantially the same way to achieve the same results are within the scope of the invention. Moreover, it should be recognized that structures and/or elements shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. An adapter for an assembly, comprising:
a valve having a first interface; and
a positioner including a second interface having ducts and corresponding thereto, the first and second interfaces being configured for tube-less and pipe-less connection of the valve to the positioner;
wherein the adapter includes a third interface corresponding to the second interface and connectable to the second interface, and a fourth interface corresponding to the first interface and connectable to the first interface, a relative position of the fourth interface with respect to the third interface being variably adjustable;
wherein rotation of the fourth interface with respect to the third interface is adjustable;
wherein the adapter includes two adapter parts, the first adapter part of the two adapter parts carrying the third interface, and the second adapter part of the two adapter parts carrying the fourth interface, and the two adapter parts being rotatable with respect to each other to adjust the rotation of the third and fourth interfaces; and
wherein, for each duct of the ducts to be led via the adapter, at least one annular duct arranged substantially concentrically with respect to the axis of rotation is provided between the two adapter parts, which is delimited by the two adapter parts and into which, in the first adapter part, at least one feed duct from the third interface opens and, in the second adapter part, at least one feed duct from the fourth interface opens.

2. The adapter as claimed in claim 1, wherein connecting surfaces of the third interface and the fourth interface are arranged parallel to each other.

3. The adapter as claimed in claim 2, further comprising:
a first screw and a second screw for fixing the second adapter part to the positioner,
wherein the second adapter part includes a first slot, into which the first screw partly screwed into a first threaded hole of the second interface is introducible by a translational movement of the second adapter part executed substantially perpendicular to the screw axis;
wherein the second adapter part has a second slot, into which the second screw, partly screwed into a second threaded hole of the second interface, is then introducible by a rotational movement of the second adapter part, executed substantially around the axis of the first screw, and
wherein the second adapter part is formed such that heads of the first and second screws introduced into the first and second slots are accessible for a tool for tightening the screws.

* * * * *